United States Patent
Makino et al.

(10) Patent No.: US 10,497,517 B2
(45) Date of Patent: Dec. 3, 2019

(54) MULTILAYER CERAMIC CAPACITOR

(71) Applicant: Murata Manufacturing Co., Ltd., Nagaokakyo-shi, Kyoto-fu (JP)

(72) Inventors: Toshikazu Makino, Nagaokakyo (JP); Hidehiko Tanaka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/945,774

(22) Filed: Apr. 5, 2018

(65) Prior Publication Data

US 2018/0294099 A1   Oct. 11, 2018

(30) Foreign Application Priority Data

Apr. 6, 2017   (JP) .................................. 2017-075955

(51) Int. Cl.
*H01G 4/232* (2006.01)
*H01G 4/12* (2006.01)

(52) U.S. Cl.
CPC .......... *H01G 4/2325* (2013.01); *H01G 4/232* (2013.01); *H01G 4/12* (2013.01)

(58) Field of Classification Search
CPC .......... H01G 4/30; H01G 4/228; H01G 4/232
See application file for complete search history.

(56) References Cited

U.S. PATENT DOCUMENTS

| | | | | |
|---|---|---|---|---|
| 5,712,758 A * | 1/1998 | Amano | ................. | H01G 4/2325 361/306.3 |
| 7,054,136 B2 * | 5/2006 | Ritter | ................... | H01G 4/2325 361/309 |
| 9,111,682 B2 | 8/2015 | Sawada et al. | | |
| 10,134,533 B2 | 11/2018 | Kimura et al. | | |
| 2004/0113127 A1 * | 6/2004 | Min | ....................... | H01B 1/128 252/500 |
| 2005/0062585 A1 * | 3/2005 | Tanaka | ................... | H01C 7/003 338/308 |
| 2006/0088709 A1 * | 4/2006 | Ito | ....................... | C04B 35/4682 428/325 |
| 2009/0284898 A1 * | 11/2009 | Kusano | ................. | C04B 35/457 361/305 |
| 2013/0020905 A1 | 1/2013 | Sawada et al. | | |
| 2017/0018359 A1 | 1/2017 | Kimura et al. | | |
| 2019/0051467 A1 | 2/2019 | Kimura et al. | | |

FOREIGN PATENT DOCUMENTS

| | | |
|---|---|---|
| JP | 2004-128328 A | 4/2004 |
| KR | 1020120085192 A | 7/2012 |
| KR | 1020170009777 A | 1/2017 |

* cited by examiner

*Primary Examiner* — Eric W Thomas
(74) *Attorney, Agent, or Firm* — Arent Fox LLP

(57) ABSTRACT

A multilayer ceramic capacitor that includes a multilayer body with dielectric layers and inner electrode layers and having a first main surface, a second main surface, a first side surface, a second side surface, a first end surface, and a second end surface; and an outer electrode on at least one of the end surfaces. The outer electrode includes a resistor layer on the at least one end surface of the multilayer body, a conductive layer on the resistor layer, and a plating layer on the conductive layer. The resistor layer contains a metallic phase, glass, and an oxide, and the resistor layer has a metallic phase content of 7.5 vol % to 15.6 vol % relative to an area of a section of the resistor layer, and the metallic phase has an average particle size of 1.6 μm or less.

17 Claims, 6 Drawing Sheets

LT SECTION VIEW

LT SECTION VIEW

MULTILAYER CERAMIC CAPACITOR

CROSS REFERENCE TO RELATED APPLICATIONS

The present application claims priority to Japanese Patent Application No. 2017-075955, filed Apr. 6, 2017, the entire contents of which are incorporated herein by reference.

BACKGROUND OF THE INVENTION

Field of the Invention

The present invention relates to a multilayer ceramic capacitor.

Description of the Related Art

Multilayer ceramic capacitors, which have low equivalent series resistance (ESR), are resonated in high-frequency regions to have impedance higher than the reference impedance of circuits in some cases. Thus, multilayer ceramic capacitors for high frequencies are provided that are multilayer ceramic capacitors connected to resistors (also referred to as resistor-equipped capacitors). Such a resistor-equipped capacitor is, for example, a multilayer ceramic capacitor including an element body in which dielectric layers (also referred to as ceramic layers) and inner electrode layers are alternately laminated, and an outer terminal electrode connected to the element body and constituted by a first conductive layer containing a conductive substance and glass, and a second conductive layer containing metal and glass (for example, Japanese Unexamined Patent Application Publication No. 2004-128328).

SUMMARY OF THE INVENTION

The technique described in Japanese Unexamined Patent Application Publication No. 2004-128328 has the following problem: in the case of adding a resistance component, with an increase in the metallic phase content of a resistor layer, variation in resistance values increases.

Accordingly, it is an object of the present invention to provide a multilayer ceramic capacitor that includes an outer electrode provided with a resistance component, and that has small variation in resistance values.

A multilayer ceramic capacitor according to a preferred embodiment of the present invention includes a multilayer body including a plurality of dielectric layers and a plurality of inner electrode layers disposed in a lamination direction, the multilayer body having a first main surface and a second main surface that are opposite each other in the lamination direction, a first side surface and a second side surface that are opposite each other in a width direction orthogonal to the lamination direction, and a first end surface and a second end surface that are opposite each other in a length direction orthogonal to the lamination direction and the width direction; and an outer electrode disposed on at least one of the end surfaces of the multilayer body, wherein the outer electrode includes a resistor layer disposed on the at least one end surface of the multilayer body, a conductive layer disposed on the resistor layer, and a plating layer disposed on the conductive layer. The resistor layer contains a metallic phase, glass, and an oxide, and the resistor layer has a metallic phase content of 7.5 vol % to 15.6 vol % relative to an area of a section of the resistor layer, and the metallic phase has an average particle size of 1.6 μm or less.

When the resistor layer has a metallic phase content of 7.5 vol % to 15.6 vol % and the metallic phase has an average particle size of 1.6 μm or less, the metallic phase is sufficiently dispersed throughout the resistor layer. This enables suppression of variation in resistance values.

In the multilayer ceramic capacitor according to the preferred embodiment of the present invention, the resistor layer preferably has a maximum thickness of 20.0 μm to 30.0 μm, and the conductive layer includes a portion covering the plurality of inner electrode layers and the portion preferably has a minimum thickness of 1.0 μm to 15.0 μm.

In the multilayer ceramic capacitor according to the preferred embodiment of the present invention, the oxide preferably contains an In—Sn compound oxide (ITO). In addition, the resistor layer preferably has an oxide content of 20.0 vol % to 40.0 vol % relative to an area of a section of the resistor layer.

In the multilayer ceramic capacitor according to the preferred embodiment of the present invention, the metallic phase is preferably formed of at least one metal selected from Ag, Ni, Cu, Au, and Pd.

The glass preferably contains at least one element selected from B, Si, Zn, Ca, Ba, and Al.

In the multilayer ceramic capacitor according to the preferred embodiment of the present invention, the plurality of inner electrode layers preferably include a first inner electrode layer extended to an end surface of the multilayer body, and a second inner electrode layer extended to a side surface of the multilayer body, and the resistor layer is preferably connected to the first inner electrode layer.

In the multilayer ceramic capacitor according to the preferred embodiment of the present invention, the multilayer body has a length being a dimension in the length direction connecting from the first end surface to the second end surface, a width being a dimension in the width direction connecting from the first side surface to the second side surface, and a thickness being a dimension in the laminating direction connecting from the first main surface to the second main surface, the length is preferably 0.95 mm to 1.10 mm, the width is preferably 0.5 mm to 0.7 mm, and the thickness is preferably 0.25 mm to 0.5 mm.

The present invention provides a multilayer ceramic capacitor that includes an outer electrode provided with a resistance component, and that has small variation in resistance values.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, multilayer ceramic capacitors and a method for producing a multilayer ceramic capacitor according to embodiments of the present invention will be described with reference to the drawings. However, the present invention is not limited to the embodiments described below. The embodiments can be appropriately changed without departing from the spirit and scope of the present invention. Combinations of two or more preferred embodiments below also fall within the scope of the present invention.

Multilayer Ceramic Capacitor

Hereinafter, a multilayer ceramic capacitor including a multilayer body and an outer electrode according to an embodiment of the present invention will be described.

Figure 1:
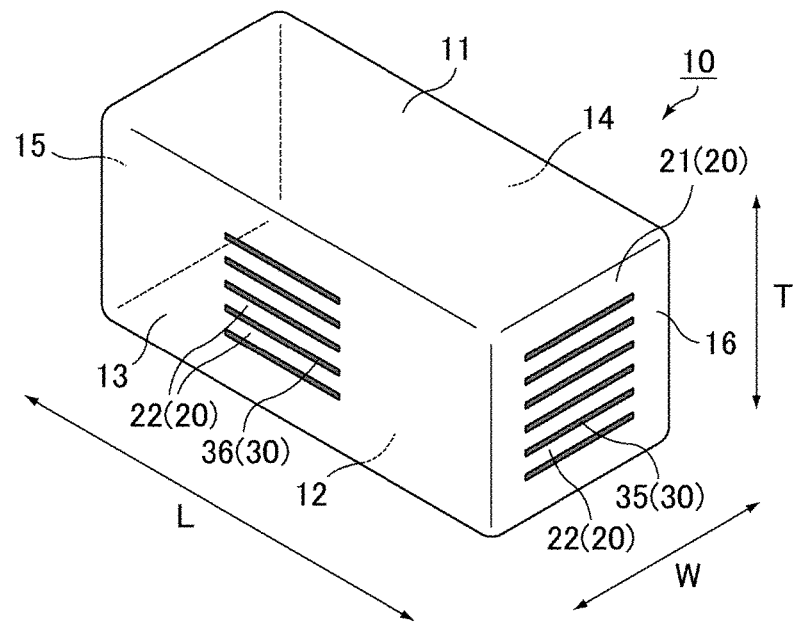
FIG. 1 is a perspective view schematically illustrating a multilayer body constituting a multilayer ceramic capacitor, according to an embodiment of the present invention.
Figure 2:
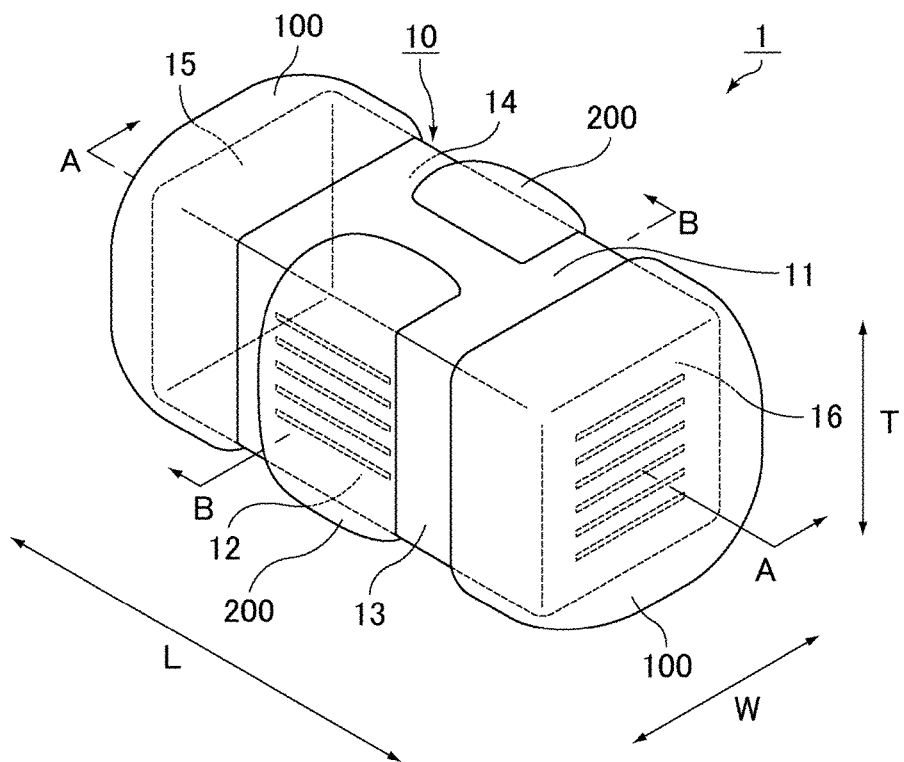
FIG. 2 is a perspective view schematically illustrating a multilayer ceramic capacitor according to an embodiment of the present invention.

Referring to FIGS. 1 and 2, the multilayer body and the outer electrode that constitute the multilayer ceramic capacitor according to the embodiment will be described.

FIG. 1 is a perspective view schematically illustrating a multilayer body constituting the multilayer ceramic capacitor according to the embodiment. FIG. 2 is a perspective view schematically illustrating the multilayer ceramic capacitor according to the embodiment.

The multilayer ceramic capacitor and the multilayer body according to the embodiment will be described with a length direction, a width direction, and a lamination direction that are respectively represented by double-headed arrows L, W, and T in a multilayer body 10 in FIG. 1 and a multilayer ceramic capacitor 1 in FIG. 2. The length direction, the width direction, and the lamination direction are orthogonal to each other. The lamination direction is a direction in which a plurality of dielectric layers 20 and a plurality of inner electrode layers 30 constituting the multilayer body 10 are laminated.

The multilayer body 10 has a substantially rectangular parallelepiped shape having six surfaces. The multilayer body 10 includes the laminate of the plurality of dielectric layers 20 and the plurality of inner electrode layers 30. As illustrated in FIG. 1, the multilayer body 10 has a first main surface 11 and a second main surface 12, which are opposite each other in the lamination direction T represented by the double-headed arrow T; a first side surface 13 and a second side surface 14, which are opposite each other in the width direction W represented by the double-headed arrow W and being orthogonal to the lamination direction T; and a first end surface 15 and a second end surface 16, which are opposite each other in the length direction L represented by the double-headed arrow L and being orthogonal to the lamination direction T and the width direction W.

In this Specification, a section of the multilayer body 10, the section intersecting the first end surface 15 and the second end surface 16 and extending in the lamination direction of the multilayer body 10, is referred to as an LT section. Another section of the multilayer body 10, the section intersecting the first side surface 13 and the second side surface 14 and extending in the lamination direction of the multilayer body 10, is referred to as a WT section. Another section of the multilayer body 10, the section intersecting the first side surface 13, the second side surface 14, the first end surface 15, and the second end surface 16 and being orthogonal to the lamination direction of the multilayer body 10, is referred to as an LW section.

The multilayer body 10 preferably has rounded corner portions and rounded ridge portions. Such a corner portion is a portion where three surfaces of the multilayer body meet. Such a ridge portion is a portion where two surfaces of the multilayer body meet.

The dielectric layers 20 include outer layer portions 21 and an inner layer portion 22. The outer layer portions 21 are dielectric layers positioned on both main surface sides of the multilayer body 10, and each positioned between one of the main surfaces and an inner electrode layer nearest to the main surface. A region sandwiched between these outer layer portions 21 is the inner layer portion 22.

The length dimension, which is the end-surface-direction dimension of the multilayer body 10 (in FIG. 1, a length represented by the double-headed arrow L), is preferably 0.95 mm to 1.10 mm. The width dimension, which is the side-surface-direction dimension of the multilayer body 10 (in FIG. 1, a length represented by the double-headed arrow W), is preferably 0.5 mm to 0.7 mm. The thickness dimension, which is the lamination-direction dimension of the multilayer body 10 (in FIG. 1, a length represented by the double-headed arrow T), is preferably 0.25 mm to 0.5 mm.

The number of dielectric layers is preferably 100 to 350. Incidentally, the number of dielectric layers does not include the number of dielectric layers constituting the outer layer portions.

Among the dielectric layers, dielectric layers constituting the inner layer portion each preferably have a thickness of 0.6 μm to 1.5 μm. The outer layer portions each preferably have a thickness of 20 μm to 100 μm.

The above-described dimensions of the multilayer body can be measured with a micrometer. The number of dielectric layers can be counted with an optical microscope.

Each dielectric layer is preferably formed of a perovskite compound typified by barium titanate ($BaTiO_3$) and represented by general formula $AmBO_3$ (the A site is occupied by Ba, and may contain, in addition to Ba, at least one selected from the group consisting of Sr and Ca; the B site is occupied by Ti, and may contain, in addition to Ti, at least one selected from the group consisting of Zr and Hf; O represents oxygen; and m represents a molar ratio of the A site to the B site.). Alternatively, each dielectric layer may be formed of a ceramic material containing, as a main component, calcium titanate ($CaTiO_3$), strontium titanate ($SrTiO_3$), or calcium zirconate ($CaZrO_3$), for example. Each dielectric layer may contain, as an auxiliary component having a lower content than the main component, Mn, Mg, Si, Co, Ni, V, Al, or a rare earth element, for example.

In the multilayer ceramic capacitor 1 illustrated in FIG. 2, the end surfaces (the first end surface 15 and the second end surface 16) of the multilayer body 10 in FIG. 1 are covered by outer electrodes 100, and the side surfaces (the first side surface 13 and the second side surface 14) of the multilayer body 10 are partially covered by outer electrodes 200. The configuration of the outer electrodes will be described later in detail.

Figure 3A:
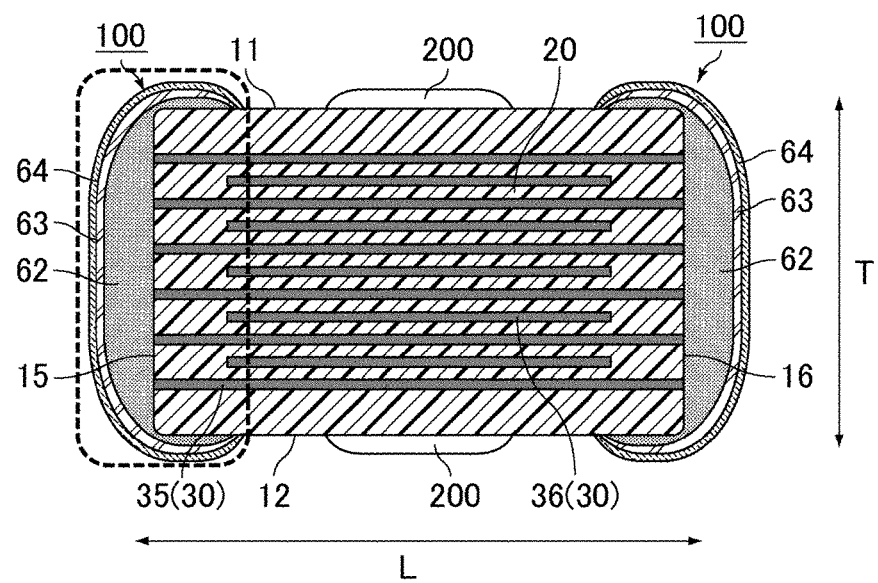
FIG. 3A is a sectional view schematically illustrating an example of an LT section of the multilayer ceramic capacitor illustrated in FIG. 2.
Figure 3B:
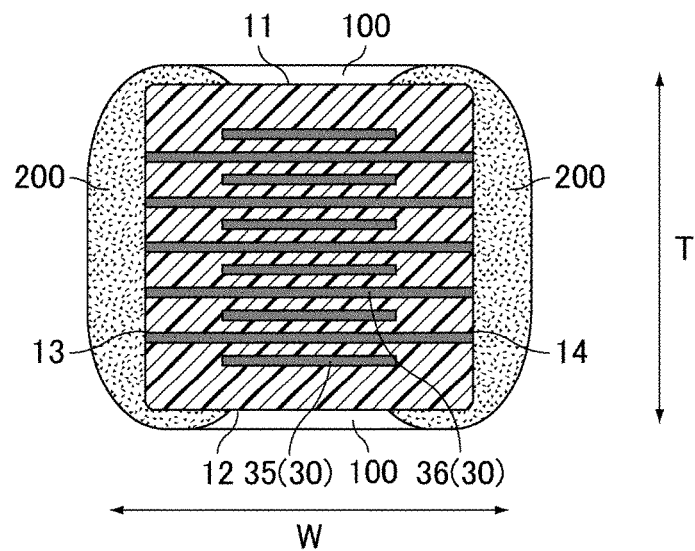
FIG. 3B is a sectional view schematically illustrating an example of a WT section of the multilayer ceramic capacitor illustrated in FIG. 2.

Referring to FIGS. 3A and 3B, the inner electrode layers and the outer electrodes constituting the multilayer ceramic capacitor according to the embodiment will be described.

FIG. 3A is a sectional view schematically illustrating an example of the LT section of the multilayer ceramic capacitor in FIG. 2. FIG. 3A is a sectional view taken along line A-A in FIG. 2. FIG. 3B is a sectional view schematically illustrating an example of the WT section of the multilayer ceramic capacitor in FIG. 2. FIG. 3B is a sectional view taken along line B-B in FIG. 2.

As illustrated in FIGS. 3A and 3B, the plurality of inner electrode layers 30 include first inner electrode layers 35 and second inner electrode layers 36 disposed in the lamination direction. The first inner electrode layers 35 are extended to the first end surface 15 and the second end surface 16. The second inner electrode layers 36 are extended to the first side surface 13 and the second side surface 14.

Each first inner electrode layer 35 includes a facing-electrode portion facing a second inner electrode layer 36 with a dielectric layer 20 therebetween, and extended electrode portions extended from the facing-electrode portion to the first end surface 15 or the second end surface 16. The first end surface 15 and the second end surface 16 have regions where the first inner electrode layers 35 are exposed.

Each second inner electrode layer 36 includes a facing-electrode portion facing the facing-electrode portion of a first inner electrode layer 35 with a dielectric layer 20 therebetween, and extended electrode portions extended from the facing-electrode portion to and exposed at the first side surface 13 or the second side surface 14. The first side surface 13 and the second side surface 14 have regions where the second inner electrode layers 36 are exposed.

The facing-electrode portions of a first inner electrode layer 35 and a second inner electrode layer 36 face each other with a dielectric layer 20 therebetween and have electrostatic capacity.

The inner electrode layers preferably contain a metal material such as Ni, Cu, Ag, Pd, Ag—Pd alloy, or Au. The inner electrode layers preferably contain a dielectric material based on the same composition as the ceramic material contained in the dielectric layers.

The number of inner electrode layers is preferably 70 to 300, more preferably 110 to 270.

The inner electrode layers preferably have an average thickness of 0.2 μm to 1.0 μm.

The ratio of a portion of each inner electrode layer, the portion covering the dielectric layers (area ratio of the portion of the layer viewed from above), is preferably 50% to 95%.

The outer electrodes 100 are outer electrodes disposed on the end surfaces of the multilayer body 10, and are connected to the first inner electrode layers 35 extended to the end surfaces of the multilayer body 10.

One of the outer electrodes 100 is disposed on, one of the end surfaces, the first end surface 15 of the multilayer body 10, and extends from the first end surface 15 to the first side surface 13, the second side surface 14, the first main surface 11, and the second main surface 12. The other outer electrode 100 is disposed on, the other end surface, the second end surface 16 of the multilayer body 10, and extends from the second end surface 16 to the first side surface 13, the second side surface 14, the first main surface 11, and the second main surface 12.

The outer electrodes 100 each include a resistor layer 62 disposed on an end surface of the multilayer body 10, a conductive layer 63 disposed on the resistor layer 62, and a plating layer 64 disposed on the conductive layer 63.

The conductive layer 63 has a lower electric resistivity than the resistor layer 62.

The resistor layer contains a metallic phase, glass, and an oxide.

The metallic phase is preferably formed of at least one metal selected from the group consisting of Ag, Ni, Cu, Au, and Pd.

The glass preferably contains at least one element selected from the group consisting of B, Si, Zn, Ca, Ba, and Al. Examples of the glass include B—Si-based glass, B—Si—Zn-based glass, B—Si—Zn—Ba-based glass, and B—Si—Zn—Ba—Ca—Al-based glass.

The oxide is a compound serving as a resistance component of the resistor layer. The resistance component refers to a component that has a relatively high electric resistivity except for metal and glass contained in commonly used outer electrodes.

Examples of the oxide serving as a resistance component include compound oxides such as In—Sn compound oxide (ITO), La—Cu compound oxide, Sr—Fe compound oxide, and Ca—Sr—Ru compound oxide, $Al_2O_3$, $ZrO_2$, $TiO_2$, and ZnO. Of these, ITO is particularly preferred.

In the multilayer ceramic capacitor according to the embodiment, the resistor layer has a metallic phase content of 7.5 vol % to 15.6 vol % relative to the area of a section of the resistor layer; and the metallic phase has an average particle size of 1.6 μm or less.

Hereinafter, how to determine the metallic phase content of the resistor layer and the average particle size of the metallic phase will be described.

Figure 4:
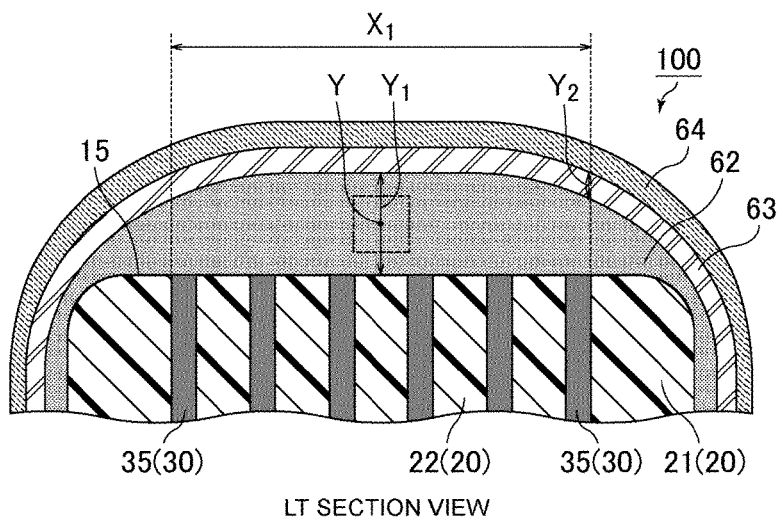
FIG. 4 is an enlarged sectional view of a near outer electrode region surrounded by a dashed line in FIG. 3A.

FIG. 4 is an enlarged sectional view of a near outer electrode region surrounded by a dashed line in FIG. 3A.

Referring to FIG. 4, in the LT sectional view of the near outer electrode region, an imaginary line (double-headed arrow $Y_1$) is drawn so as to extend perpendicularly to the end surface of the multilayer body, in a portion where the resistor layer has the maximum thickness (normally, in the center of the lamination direction). A 20 μm×20 μm field of view is defined around a center that is a middle point Y of the imaginary line. In FIG. 4, this field of view is indicated with a square drawn with a dotted line.

The LT section is obtained by polishing the multilayer ceramic capacitor to the central portion in the width direction such that the polished surface includes the outer electrodes, and by removing the edge roll-off of the polished surface.

The middle point Y is the "center portion in the thickness direction".

An image of this field of view is captured with a SEM (scanning electron microscope). In the captured image, the metallic phase is extracted and subjected to image processing to calculate the accumulated area of the metallic phase and the average particle size of equivalent circle diameters of the metallic phase.

The analysis field of the section of the resistor layer has an area of 20 μm×20 μm, and the metallic phase content (vol %) is calculated with the following formula.

Metallic phase content (vol %)=[accumulated area of metallic phase (μm$^2$)/(20×20)]×100

The metallic phase content of the resistor layer is thus determined as a content based on volume and described in vol %.

When the metallic phase content is less than 7.5 vol %, variation in resistance values is inherently small regardless of the average particle size of the metallic phase. Thus, the advantage of the embodiment of reducing variation in resistance values by adjusting the average particle size of the metallic phase is less likely to be provided.

In particular, when the metallic phase content is less than 7.5 vol %, a resistor layer having a relatively low resistance value such as 100 mΩ or less may be difficult to design. Thus, in order to design a resistor layer having a relatively low resistance value, and to reduce variation in resistance values, the metallic phase content is preferably set to 7.5 vol % or more, and the average particle size of the metallic phase is preferably set to 1.6 µm or less.

When the metallic phase content is more than 15.6 vol %, the particle sizes are difficult to control, and a reduction in variation in resistance values is not achieved.

When the metallic phase is constituted by a plurality of metal species, the total content of these metal species is determined as the metallic phase content.

The average particle size of the metallic phase is the average particle size of the equivalent circle diameters determined in the above-described manner.

The metallic phase is adjusted to have an average particle size of 1.6 µm or less. In this case, the metallic phase does not have excessively large sizes. In other words, the metallic phase does not aggregate and is sufficiently dispersed throughout the resistor layer.

The metallic phase preferably has an average particle size of 1.0 µm or less.

A sufficiently dispersed metallic phase provides a multilayer ceramic capacitor in which the resistor layer has small variation in resistance values. The metallic phase preferably has an average particle size of 0.2 µm or more.

The resistor layer preferably has an oxide content of 20.0 vol % to 40.0 vol % relative to the area of a section of the resistor layer. The oxide content of the resistor layer can be determined as in the calculation method of the metallic phase content. Specifically, an image of a section of the resistor layer is captured with a SEM. In the captured image, oxide is extracted and subjected to image processing to determine the accumulated area of oxide. From the accumulated area of oxide, the oxide content can be calculated with the following formula.

Oxide content (vol %)=[accumulated area of oxide $(\mu m^2)/(20\times20)]\times100$ When the oxide is constituted by a plurality of oxide species, the total content of these oxide species is determined as the oxide content.

In this Specification, the SEM used for observing the resistor layer is preferably an FE-SEM (field-emission scanning electron microscope).

Hereinafter, the conductive layer disposed on the resistor layer, and the plating layer disposed on the conductive layer will be described.

The conductive layer preferably includes at least one layer selected from the group consisting of a metallized layer, a resin layer, and a thin film layer.

The metallized layer preferably contains glass and metal. The glass is formed from $BaO-SrO-B_2O_3-SiO_2$-based glass frit, for example. The metal preferably contains at least one selected from the group consisting of Cu, Ni, Ag, Pd, Ag—Pd alloy, and Au, for example. A plurality of metallized layers may be formed.

The metallized layer is formed by applying a conductive paste containing glass and metal to the multilayer body and by firing the applied paste. The applied paste may be co-fired with the inner electrode layers. Alternatively, the applied paste may be fired after firing of the inner electrode layers.

The resin layer may contain conductive particles and a thermosetting resin. When the resin layer is formed, it may be formed directly on the resistor layer without formation of the metallized layer. A plurality of resin layers may be formed.

The thin film layer is formed by a thin film formation method such as sputtering or vapor deposition. The thin film layer is a layer of deposited metal particles and has a thickness of 1 µm or less.

The plating layer preferably contains at least one metal selected from the group consisting of Cu, Ni, Ag, Pd, Ag—Pd alloy, Au, and Sn, for example.

The plating layer may be constituted by a plurality of layers. The plating layer preferably has a bilayer structure constituted by a Ni plating layer and a Sn plating layer. The Ni plating layer prevents the underlying electrode layer from being eroded by solder used during mounting of the multilayer ceramic capacitor. The Sn plating layer enhances the wettability of solder used during mounting of the multilayer ceramic capacitor to thereby facilitate the mounting.

Hereinafter, preferred thicknesses of layers constituting the outer electrode will be described.

The resistor layer preferably has a maximum thickness of 20.0 µm to 30.0 µm. The resistor layer normally has the maximum thickness in the center of the layer in the lamination direction. This center is indicated by the double-headed arrow $Y_1$ in FIG. 4.

The conductive layer includes a portion covering the inner electrode layers, and the portion preferably has a minimum thickness of 1.0 µm to 15.0 µm.

The portion of the conductive layer, the portion covering the inner electrode layers, is indicated by a double-headed arrow $X_1$ in FIG. 4, and means a portion ranging between the outermost inner electrode layers.

In this portion, the conductive layer preferably has a minimum thickness of 1.0 µm to 15.0 µm. In FIG. 4, the minimum thickness of the conductive layer is schematically represented by a double-headed arrow $Y_2$.

When the conductive layer includes the metallized layer, the metallized layer preferably has a maximum thickness of 20 µm to 30 µm.

When the conductive layer includes the resin layer, the resin layer preferably has a maximum thickness of 5 to 30 µm.

The thickness of a single plating layer is preferably 1 µm to 10 µm. When the plating layer includes a Ni plating layer and a Sn plating layer, the total thickness of these layers is preferably about 10 µm.

The outer electrodes 200 are outer electrodes disposed on the side surfaces of the multilayer body 10, and are connected to the second inner electrode layers 36 extended to the side surfaces of the multilayer body 10.

One of the outer electrodes 200 is disposed on, one of the side surfaces, the first side surface 13 of the multilayer body 10, and extends from the first side surface 13 to the first main surface 11 and the second main surface 12. The other outer electrode 200 is disposed on, the other side surface, the second side surface 14 of the multilayer body 10, and extends from the second side surface 14 to the first main surface 11 and the second main surface 12.

The outer electrodes 200 may have the same configuration as the outer electrodes 100, specifically, may have a configuration including a resistor layer, a conductive layer, and a plating layer. Alternatively, the outer electrodes 200 may have a layer configuration different from that of the outer electrodes 100.

For example, the outer electrodes 200 may be outer electrodes having low resistance and formed by applying a conductive paste containing conductive particles such as copper powder and by firing the applied paste.

Figure 5:
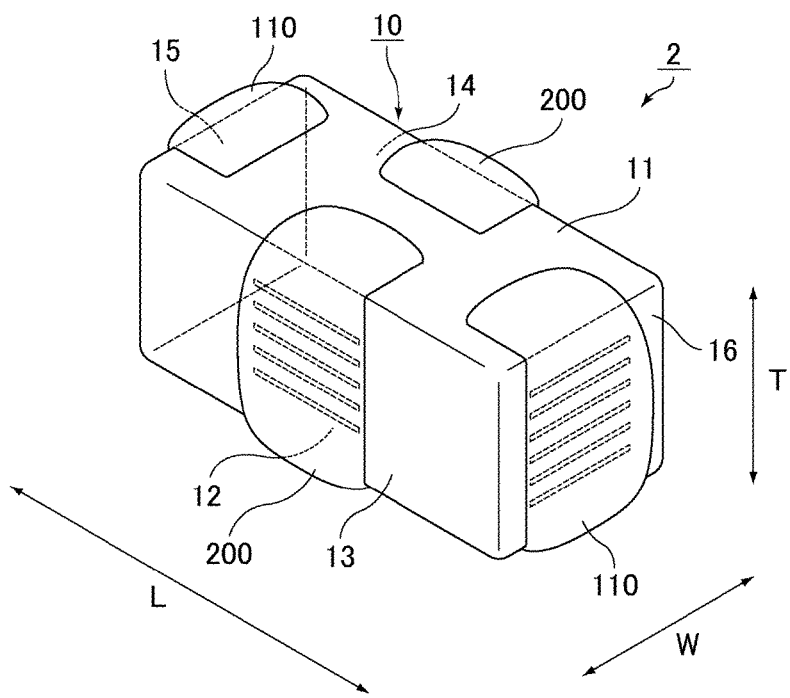
FIG. 5 is a perspective view schematically illustrating a multilayer ceramic capacitor according to another embodiment of the present invention.

FIG. 5 is a perspective view schematically illustrating a multilayer ceramic capacitor according to another embodiment of the present invention.

Referring to FIG. 5, in a multilayer ceramic capacitor 2, outer electrodes 110 are disposed to partially cover the end surfaces of the multilayer body 10.

The multilayer ceramic capacitor 2 is the same as the multilayer ceramic capacitor 1 in FIG. 2 in that the outer electrodes 110 are outer electrodes disposed on the end surfaces of the multilayer body 10, and are connected to the first inner electrode layers 35 extended to the end surfaces of the multilayer body 10.

In the multilayer ceramic capacitor 2, the outer electrodes 110 have the same configuration as the outer electrodes 100 of the multilayer ceramic capacitor 1 in FIG. 2 except for the covered area of the outer electrodes 110.

In the multilayer ceramic capacitor 2, one of the outer electrodes 110 is disposed on, one of the end surfaces, the first end surface 15 of the multilayer body 10, and extends from the first end surface 15 to the first main surface 11 and the second main surface 12. The other outer electrode 110 is disposed on, the other end surface, the second end surface 16 of the multilayer body 10, and extends from the second end surface 16 to the first main surface 11 and the second main surface 12.

These outer electrodes 110 include, as with the outer electrodes 100 of the multilayer ceramic capacitor 1 in FIG. 2, a resistor layer disposed on an end surface of the multilayer body 10, a conductive layer disposed on the resistor layer, and a plating layer disposed on the conductive layer.

The metallic phase content of the resistor layer and the average particle size of the metallic phase are set to be in the predetermined ranges.

Figure 6:
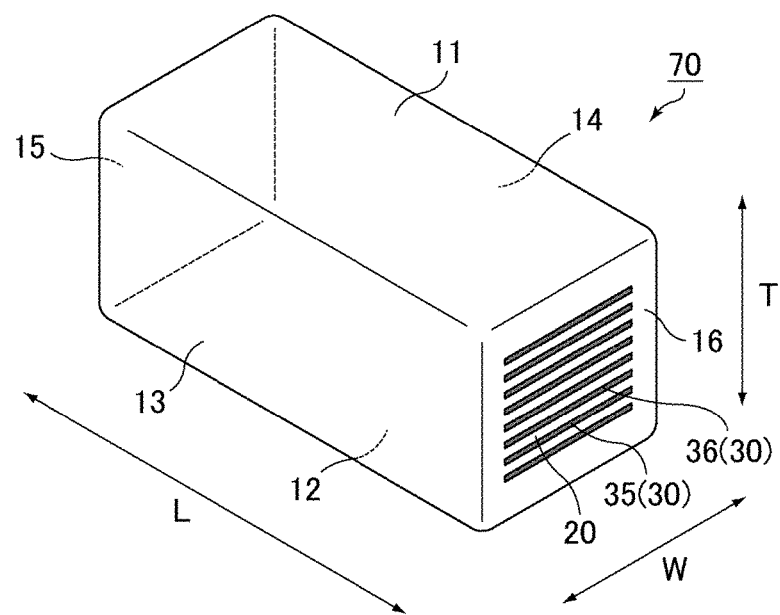
FIG. 6 is a perspective view schematically illustrating a multilayer body constituting a multilayer ceramic capacitor, according to another embodiment of the present invention.
Figure 7:
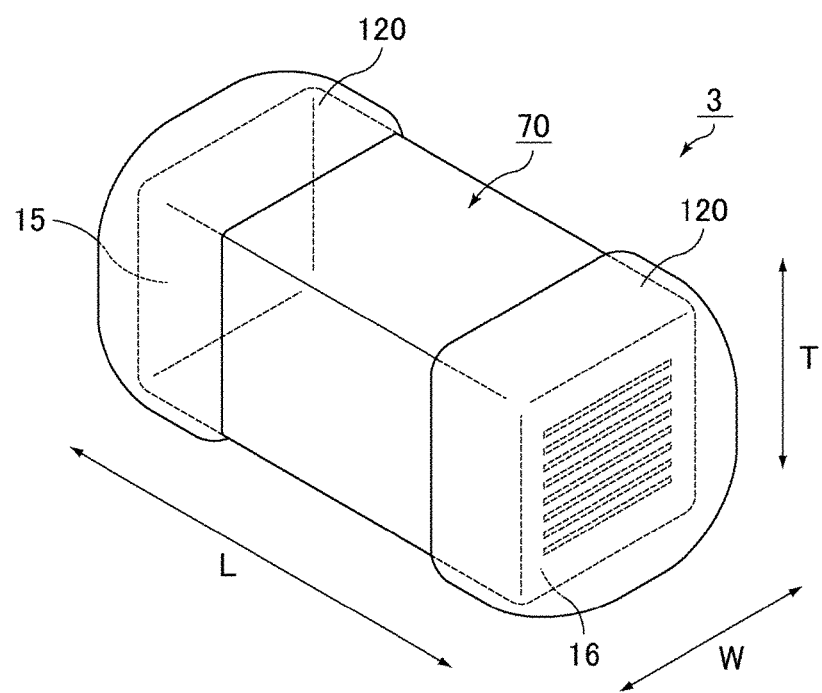
FIG. 7 is a perspective view schematically illustrating a multilayer ceramic capacitor according to another embodiment of the present invention.

FIG. 6 is a perspective view schematically illustrating a multilayer body constituting a multilayer ceramic capacitor, according to another embodiment of the present invention. FIG. 7 is a perspective view schematically illustrating a multilayer ceramic capacitor according to another embodiment of the present invention.

Referring to FIG. 6, in a multilayer body 70, all the inner electrode layers 30 are extended to the end surfaces of the multilayer body. Specifically, the first inner electrode layers 35 and the second inner electrode layers 36 are alternately extended to the first end surface 15; and the first inner electrode layers 35 and the second inner electrode layers 36 are also alternately extended to the second end surface 16. This is the configuration of a multilayer body that constitutes, what is called, a two-terminal multilayer ceramic capacitor.

FIG. 7 illustrates a multilayer ceramic capacitor 3 in which outer electrodes 120 are disposed on the end surfaces of the multilayer body 70 in FIG. 6.

The multilayer ceramic capacitor 3 has the same configuration as the multilayer ceramic capacitor 1 in FIG. 2 except that the multilayer body has a different configuration and the outer electrodes are disposed only on the end surfaces of the multilayer body. The outer electrodes 120 are outer electrodes disposed on the end surfaces of the multilayer body 70, and are connected to the first inner electrode layers 35 and the second inner electrode layers 36 extended to the end surfaces of the multilayer body 70.

In the multilayer ceramic capacitor 3, one of the outer electrodes 120 is disposed on, one of the end surfaces, the first end surface 15 of the multilayer body 70, and extends from the first end surface 15 to the first side surface 13, the second side surface 14, the first main surface 11, and the second main surface 12. The other outer electrode 120 is disposed on, the other end surface, the second end surface 16 of the multilayer body 70, and extends from the second end surface 16 to the first side surface 13, the second side surface 14, the first main surface 11, and the second main surface 12.

These outer electrodes 120 include, as with the outer electrodes 100 of the multilayer ceramic capacitor 1 in FIG. 2, a resistor layer disposed on an end surface of the multilayer body 70, a conductive layer disposed on the resistor layer, and a plating layer disposed on the conductive layer.

The metallic phase content of the resistor layer and the average particle size of the metallic phase are set to be in the predetermined ranges.

Figure 8:
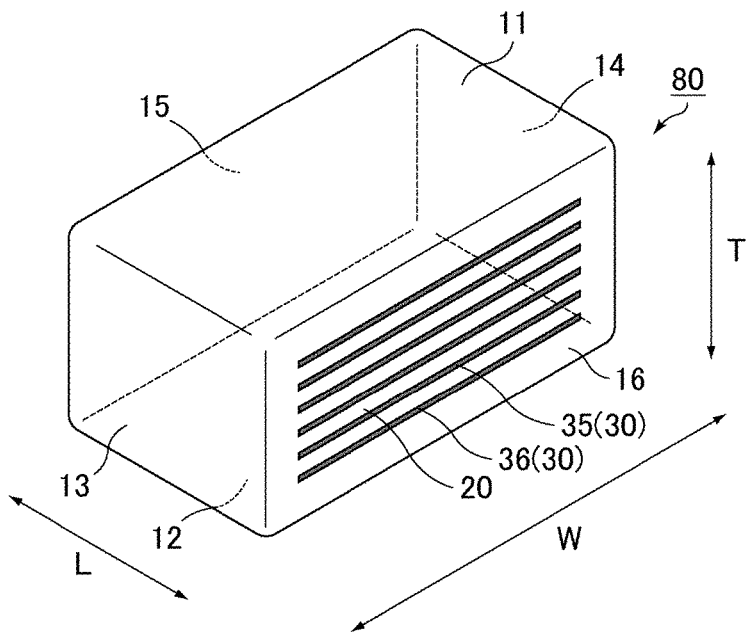
FIG. 8 is a perspective view schematically illustrating a multilayer body constituting a multilayer ceramic capacitor, according to another embodiment of the present invention.
Figure 9:
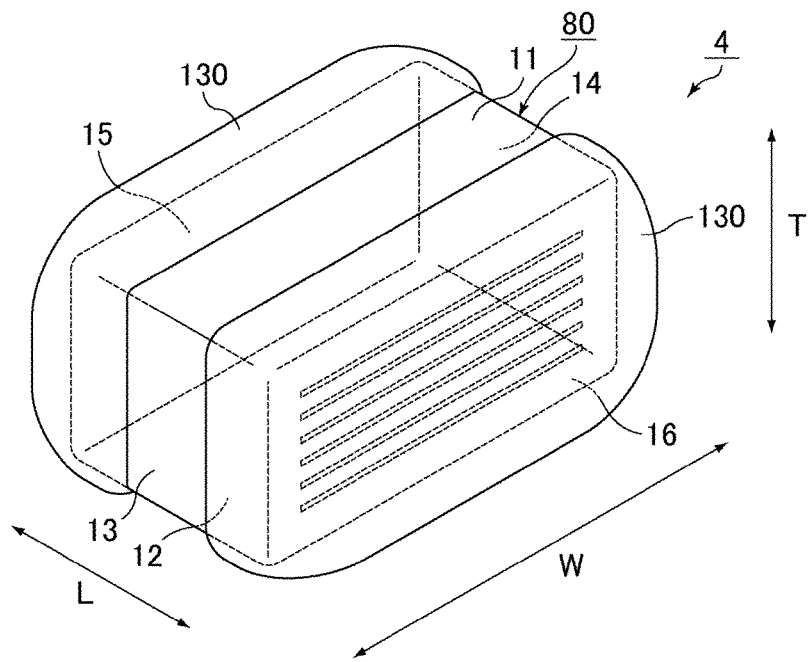
FIG. 9 is a perspective view schematically illustrating a multilayer ceramic capacitor according to another embodiment of the present invention.

FIG. 8 is a perspective view schematically illustrating a multilayer body constituting a multilayer ceramic capacitor, according to another embodiment of the present invention. FIG. 9 is a perspective view schematically illustrating a multilayer ceramic capacitor according to another embodiment of the present invention.

Referring to FIG. 8, a multilayer body 80 is a multilayer body constituting a two-terminal multilayer ceramic capacitor as with the multilayer body 70 in FIG. 6. However, the multilayer body 80 is different from the multilayer body 70 in that the width dimension (a length represented by a double-headed arrow W) is larger than the length dimension (a length represented by a double-headed arrow L). This is the configuration of a multilayer body that constitutes an LW-reversed capacitor among, what is called, two-terminal multilayer ceramic capacitors.

In this case, the multilayer body 80 preferably has a width dimension of 0.95 mm to 1.10 mm. The multilayer body 80 preferably has a length dimension of 0.5 mm to 0.7 mm. The multilayer body 80 preferably has a thickness dimension of 0.25 mm to 0.5 mm.

Referring to FIG. 8, in the multilayer body 80, all the inner electrode layers 30 are extended to the end surfaces of the multilayer body. Specifically, the first inner electrode layers 35 and the second inner electrode layers 36 are alternately extended to the first end surface 15, and the first inner electrode layers 35 and the second inner electrode layers 36 are also alternately extended to the second end surface 16.

FIG. 9 illustrates a multilayer ceramic capacitor 4 in which outer electrodes 130 are disposed on the end surfaces of the multilayer body 80 in FIG. 8.

The multilayer ceramic capacitor 4 has the same configuration as the multilayer ceramic capacitor 1 in FIG. 2 except that it includes a multilayer body having a different configuration, specifically, the outer electrodes are disposed only on the end surfaces of the multilayer body. The outer electrodes 130 are outer electrodes that are disposed on the end surfaces of the multilayer body 80, and that are connected to the first inner electrode layers 35 and the second inner electrode layers 36 extended to the end surfaces of the multilayer body 80.

In the multilayer ceramic capacitor 4, one of the outer electrodes 130 is disposed on, one of the end surfaces, the first end surface 15 of the multilayer body 80, and extends from the first end surface 15 to the first side surface 13, the second side surface 14, the first main surface 11, and the second main surface 12. The other outer electrode 130 is disposed on, the other end surface, the second end surface 16 of the multilayer body 80, and extends from the second end surface 16 to the first side surface 13, the second side surface 14, the first main surface 11, and the second main surface 12.

These outer electrodes 130 include, as with the outer electrodes 100 of the multilayer ceramic capacitor 1 in FIG. 2, a resistor layer disposed on an end surface of the multilayer body 80, a conductive layer disposed on the resistor layer, a plating layer disposed on the conductive layer.

The metallic phase content of the resistor layer and the average particle size of the metallic phase are set to be in the predetermined ranges.

Method for Producing Multilayer Ceramic Capacitor

Hereinafter, a method for producing a multilayer ceramic capacitor, the method being producible a multilayer ceramic capacitor according to an embodiment of the present invention, will be described.

Dielectric sheets and a conductive paste for forming inner electrode layers are prepared. The dielectric sheets and the conductive paste for forming inner electrode layers contain a binder and a solvent that can be selected from known organic binders and organic solvents. The ceramic used for forming the dielectric layers is preferably the same as that for forming dielectric layers of the above-described multilayer ceramic capacitor according to the embodiment.

The conductive paste for forming inner electrode layers is applied to the dielectric sheets by, for example, screen printing or gravure printing to form predetermined patterns. Thus, inner electrode patterns are formed.

A predetermined number of dielectric sheets not having inner electrode patterns and used for forming outer layers are laminated. On the resultant laminate, dielectric sheets having inner electrode patterns are sequentially laminated. On the resultant laminate, a predetermined number of dielectric sheets used for forming outer layers are laminated. Thus, a multilayer sheet is produced.

The multilayer sheet is pressed in the lamination direction with an isostatic press, for example, to thereby provide a multilayer block.

The multilayer block is cut into a predetermined size to provide multilayer chips. At this time, the multilayer chips may be subjected to barrel finishing, for example, to round the corner portions and ridge portions of the multilayer chips.

The multilayer chips are fired to produce multilayer bodies. The firing temperature varies depending on the materials of the dielectric and the inner electrode layers, and is preferably 900° C. to 1300° C.

Subsequently, outer electrodes are formed on the end surfaces (to which the inner electrode layers of such a multilayer body are extended) of the multilayer body.

Specifically, a resistor paste for forming resistor layers is first prepared. The resistor paste contains metal particles that are to form a metallic phase, glass, and oxide. The resistor paste may contain an organic vehicle and a binder.

The resistor paste is mixed with an apparatus such as a triple-roll mill to achieve uniform dispersion of the components contained in the resistor paste.

The resistor paste is applied to both end surfaces of the multilayer body, and baked to form resistor layers. The baking temperature is preferably 700° C. to 900° C.

Subsequently, a conductive paste for forming conductive layers is prepared. For example, the conductive paste is prepared by mixing Cu particles, glass, an organic vehicle, and a binder with a triple-roll mill to achieve dispersion of these components.

An example case where the conductive layers are metallized layers will be described. The conductive paste is applied to the resistor layers formed on both end surfaces of the multilayer body, and baked to form metallized layers. The baking temperature is preferably 700° C. to 900° C. This baking temperature is preferably lower than the baking temperature for the resistor layers.

The surfaces of the conductive layers (metallized layers) are plated to form plating layers. Thus, outer electrodes are formed.

When outer electrodes are formed on the side surfaces of the multilayer body, the same method as the method of forming outer electrodes on the end surfaces of the multilayer body may be performed to form, on the side surfaces, outer electrodes containing a resistance component. A conductive paste containing conductive particles such as copper powder may be applied to the side surfaces of the multilayer body and fired to form outer electrodes having a low resistance.

EXAMPLES

Hereinafter, multilayer ceramic capacitors according to embodiments of the present invention will be more specifically described with reference to Examples. However, the present invention is not limited to these Examples.

Examples 1 to 5 and Comparative Examples 1 to 6

Production of Multilayer Bodies

To $BaTiO_3$ serving as a ceramic raw material, a polyvinyl butyral binder, a plasticizer, and ethanol serving as an organic solvent were added. These materials were subjected to wet blending with a ball mill to prepare ceramic slurry. Subsequently, the ceramic slurry was formed into sheets by a lip process to obtain rectangular ceramic green sheets. Subsequently, a conductive paste containing Ni was applied to the ceramic green sheets by screen printing to thereby form inner electrode patterns containing Ni as a main component. Subsequently, a plurality of ceramic green sheets having the inner electrode patterns are laminated such that the inner electrode layers are extended to be exposed alternately in a different direction. Thus, a green multilayer sheet that was to serve as a capacitor body was obtained. Subsequently, the green multilayer sheet was pressed, and divided with a dicing machine to obtain chips. The chips were heated in a $N_2$ atmosphere at 1200° C. to burn the binder, and subsequently fired in a reducing atmosphere containing $H_2$, $N_2$, and $H_2O$ gas to obtain sintered multilayer bodies. The multilayer bodies each had a structure including a plurality of dielectric layers and a plurality of inner electrode layers.

The multilayer bodies each had a length dimension (in the L direction) of 0.92 mm, a width dimension (in the W direction) of 0.55 mm, and a lamination-direction dimension (in the T direction) of 0.39 mm. The first end surface and the second end surface had regions where the first inner electrode layers were exposed. The first side surface and the second side surface had regions where the second inner electrode layers were exposed.

The multilayer bodies were subjected to barrel finishing to round the corner portions of the multilayer bodies.

In each multilayer body, the inner electrode layers had an average thickness of 0.55 μm. The dielectric layers interposed between the inner electrode layers had an average thickness of 0.75 μm. The number of the inner electrode layers was 266.

A resistor paste was prepared so as to contain Cu particles (average particle size: 0.5 μm), glass (BaO—SrO—$B_2O_3$—$SiO_2$-based glass frit), oxide (ITO, $ZrO_2$, and $Al_2O_3$), an organic vehicle, and a binder.

The proportions of the components contained in the resistor paste are summarized in Table 1 below.

In Table 1, the proportion of oxide is described as the total amount of ITO, $ZrO_2$, and $Al_2O_3$.

In each of Examples 1 to 5 and Comparative Examples 1 and 6, the components in the resistor paste were mixed so as to be uniformly dispersed in the resistor paste. In each of Comparative Examples 2 to 5, the components in the resistor paste were not uniformly dispersed.

In Table 1, in the column "Degree of dispersion of components in resistor paste", examples in which the components were uniformly dispersed in each resistor paste were described as High, and the other examples in which the components were not uniformly dispersed in each resistor paste were described as Low.

TABLE 1

| | Proportions of components (vol %) | | | |
| --- | --- | --- | --- | --- |
| | Cu particles | Glass | Oxide | Degree of dispersion of components in resistor paste |
| Example 1 | 7.5 | 50.0 | 42.5 | High |
| Example 2 | 10.0 | 50.0 | 40.0 | High |
| Example 3 | 12.7 | 50.0 | 37.3 | High |
| Example 4 | 15.6 | 50.0 | 34.4 | High |
| Example 5 | 10.0 | 70.0 | 20.0 | High |
| Comparative Example 1 | 4.9 | 50.0 | 45.1 | High |
| Comparative Example 2 | 4.9 | 50.0 | 45.1 | Low |
| Comparative Example 3 | 7.5 | 50.0 | 42.5 | Low |
| Comparative Example 4 | 11.0 | 50.0 | 39 | Low |
| Comparative Example 5 | 14.9 | 50.0 | 35.1 | Low |
| Comparative Example 6 | 17.2 | 50.0 | 32.8 | High |

Such a resistor paste was applied to the first end surface and the second end surface of the multilayer body, and fired at 900° C. to form resistor layers.

A conductive paste was prepared by dispersing Cu particles, glass, an organic vehicle, and a binder using a triple-roll mill. The conductive paste was applied to the resistor layers and fired at 800° C. to form conductive layers.

Another conductive paste containing Cu particles was prepared. The conductive paste was applied to the first side surface and the second side surface so as to cover the regions where the second inner electrode layers were exposed. The applied paste was fired at 700° C. to form other outer electrodes on the first side surface and the second side surface.

Finally, a Ni plating layer and a Sn plating layer were formed on each outer electrode.

In the above-described manner, three-terminal multilayer ceramic capacitors according to Examples and Comparative Examples were obtained.

Figure 10A:
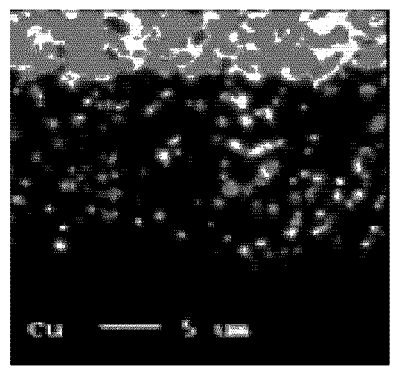
FIG. 10A is an electron micrograph of a near outer electrode region in Example 2.
Figure 10B:
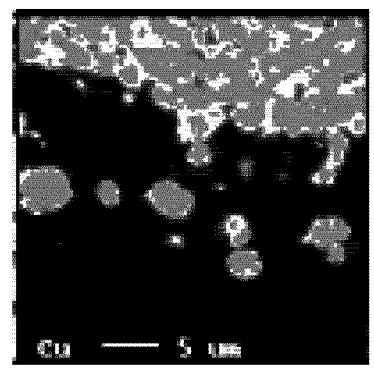
FIG. 10B is an electron micrograph of a near outer electrode region in Comparative Example 6.

Measurements of Metallic Phase Content and Average Particle Size of Metallic Phase The methods described in this Specification were used to measure the metallic phase content of a resistor layer in an outer electrode on an end surface of each multilayer body, and the average particle size of the metallic phase. The results are summarized in Table 2. Examples of the results are as follows. FIG. 10A is an electron micrograph of a near outer electrode region in Example 2. FIG. 10B is an electron micrograph of a near outer electrode region in Comparative Example 6.

Each micrograph shows, in the ascending order, a multilayer body, a resistor layer, and a conductive layer. In the micrograph, the resistor layer occupies a central region corresponding to one-third of the thickness of the micrograph. This region includes gray dots (areas), which correspond to the distribution of Cu as a metallic phase.

Comparison between these two micrographs reveals that the metallic phase aggregates in the resistor layer in Comparative Example 6, so that the metallic phase has a larger average particle size.

Measurements of Resistance Values and Variation in Resistance Values

Each multilayer ceramic capacitor was pinched, at its first end surface-side outer electrode and second end surface-side outer electrode, between parts of a test fixture (16044A, manufactured by Agilent Technologies). The resistance value of the multilayer ceramic capacitor was measured with a digital resistance meter 755611 (manufactured by Yokogawa Electric Corporation) at an applied current of 10 mA.

In this way, the resistance values of 20 multilayer ceramic capacitors were measured. The average (mΩ) of the resistance values and variation in the resistance values (CV: coefficient of variation) were determined. The results are summarized in Table 2.

TABLE 2

| | Metallic phase | Resistance value | |
| --- | --- | --- | --- |
| | Average particle size (μm) | Resistance value (mΩ) | Variation (CV) |
| Example 1 | 1.00 | 118 | 4 |
| Example 2 | 1.13 | 103 | 5 |
| Example 3 | 1.40 | 72 | 7 |
| Example 4 | 1.52 | 3 | 9 |
| Example 5 | 1.60 | 110 | 10 |
| Comparative Example 1 | 0.93 | 137 | 4 |
| Comparative Example 2 | 2.13 | 129 | 7 |
| Comparative Example 3 | 2.06 | 110 | 16 |
| Comparative Example 4 | 1.88 | 86 | 15 |
| Comparative Example 5 | 2.23 | 22 | 19 |
| Comparative Example 6 | 1.93 | 0.6 | 13 |

The multilayer ceramic capacitors of each Example, in which the metallic phase content of the resistor layers and the average particle size of the metallic phase are in the predetermined ranges, have appropriate resistance values and small variation in the resistance values.

In each of Comparative Examples 1 and 2, the metallic phase content of the resistor layers was a low value of less than 7.5 vol %, so that variation in resistance values was small regardless of the average particle size of the metallic phase. Thus, the advantage of reducing variation in resistance values by adjusting the average particle size of the metallic phase was not effectively provided.

In each of Comparative Examples 3 to 5, the metallic phase had an excessively large average particle size and hence large variation in the resistance values was observed.

In Comparative Example 6, the metallic phase content of the resistor layers was excessively high. Thus, in spite of uniform dispersion of the components of the resistor paste, the metallic phase contained in the resistor layers had a large average particle size, which resulted in large variation in the resistance values.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A multilayer ceramic capacitor comprising:
    a multilayer body including a plurality of dielectric layers and a plurality of inner electrode layers alternately disposed in a lamination direction, the multilayer body having a first main surface and a second main surface that are opposite each other in the lamination direction, a first side surface and a second side surface that are opposite each other in a width direction orthogonal to the lamination direction, and a first end surface and a second end surface that are opposite each other in a length direction orthogonal to the lamination direction and the width direction; and
    an outer electrode on at least one of the first end surface and the second end surface of the multilayer body, wherein the outer electrode includes:
        a resistor layer on the at least one of the first end surface and the second end surface of the multilayer body,
        a conductive layer on the resistor layer, and
        a plating layer on the conductive layer,
        wherein the resistor layer contains a metallic phase, glass, and an oxide, and
        the resistor layer has a metallic phase content of 7.5 vol % to 15.6 vol % with respect to an area of a cross section of the resistor layer, and the metallic phase has an average particle size of 1.6 μm or less.

2. The multilayer ceramic capacitor according to claim 1, wherein the resistor layer has a maximum thickness of 20.0 μm to 30.0 μm, and
    the conductive layer includes a portion covering the plurality of inner electrode layers and the portion has a minimum thickness of 1.0 μm to 15.0 μm.

3. The multilayer ceramic capacitor according to claim 2, wherein the oxide contains an In—Sn compound oxide, and the resistor layer has an oxide content of 20.0 vol % to 40.0 vol % with respect to the area of the cross section of the resistor layer.

4. The multilayer ceramic capacitor according to claim 3, wherein the metallic phase includes at least one metal selected from Ag, Ni, Cu, Au, and Pd.

5. The multilayer ceramic capacitor according to claim 4, wherein the glass contains at least one element selected from B, Si, Zn, Ca, Ba, and Al.

6. The multilayer ceramic capacitor according to claim 1, wherein the resistor layer has a maximum thickness of 20.0 μm to 30.0 μm.

7. The multilayer ceramic capacitor according to claim 1, wherein the conductive layer includes a portion covering the plurality of inner electrode layers and the portion has a minimum thickness of 1.0 μm to 15.0 μm.

8. The multilayer ceramic capacitor according to claim 1, wherein the oxide contains an In—Sn compound oxide, and the resistor layer has an oxide content of 20.0 vol % to 40.0 vol % with respect to the area of the cross section of the resistor layer.

9. The multilayer ceramic capacitor according to claim 1, wherein the metallic phase includes at least one metal selected from Ag, Ni, Cu, Au, and Pd.

10. The multilayer ceramic capacitor according to claim 1, wherein the glass contains at least one element selected from B, Si, Zn, Ca, Ba, and Al.

11. The multilayer ceramic capacitor according to claim 1, wherein the conductive layer has a lower electric resistivity than the resistor layer.

12. The multilayer ceramic capacitor according to claim 1, wherein the oxide is selected from an In—Sn compound oxide, a La—Cu compound oxide, a Sr—Fe compound oxide, a Ca—Sr—Ru compound oxide, $Al_2O_3$, $ZrO_2$, $TiO_2$, and ZnO.

13. The multilayer ceramic capacitor according to claim 1, wherein the resistor layer has an oxide content of 20.0 vol % to 40.0 vol % with respect to the area of the cross section of the resistor layer.

14. The multilayer ceramic capacitor according to claim 1, wherein the average particle size of the metallic phase is 0.2 μm to 1.0 μm.

15. The multilayer ceramic capacitor according to claim 1, wherein the conductive layer includes at least one layer selected from a metallized layer, a resin layer, and a film layer.

16. The multilayer ceramic capacitor according to claim 1, wherein the plurality of inner electrode layers include:
    a first inner electrode layer extended to one of the first end surface and the second end surface of the multilayer body, and
    a second inner electrode layer extended to one of the first side surface and the second side surface of the multilayer body, and
    wherein the resistor layer is electrically connected to the first inner electrode layer.

17. The multilayer ceramic capacitor according to claim 1,
    wherein the multilayer body has
    a length of 0.95 mm to 1.10 mm as measured in the length direction from the first end surface to the second end surface,
    a width of 0.5 mm to 0.7 mm as measured in the width direction from the first side surface to the second side surface, and
    a thickness of 0.25 mm to 0.5 mm as measured in the laminating direction from the first main surface to the second main surface.

* * * * *